(12) United States Patent
Hasegawa

(10) Patent No.: US 10,474,058 B2
(45) Date of Patent: Nov. 12, 2019

(54) IMAGE FORMING APPARATUS

(71) Applicant: Oki Data Corporation, Tokyo (JP)

(72) Inventor: Kentaro Hasegawa, Tokyo (JP)

(73) Assignee: Oki Data Corporation, Tokyo (JP)

( * ) Notice: Subject to any disclaimer, the term of this patent is extended or adjusted under 35 U.S.C. 154(b) by 0 days.

(21) Appl. No.: 16/251,020

(22) Filed: Jan. 17, 2019

(65) Prior Publication Data
US 2019/0235411 A1 Aug. 1, 2019

(30) Foreign Application Priority Data
Jan. 29, 2018 (JP) ................. 2018-012359

(51) Int. Cl.
| G03G 15/08 | (2006.01) |
|---|---|
| G03G 15/02 | (2006.01) |
| G03G 15/09 | (2006.01) |
| H04N 1/40 | (2006.01) |
| G03G 15/04 | (2006.01) |
| H04N 1/00 | (2006.01) |

(52) U.S. Cl.
CPC ..... G03G 15/0808 (2013.01); G03G 15/0225 (2013.01); G03G 15/0409 (2013.01); G03G 15/04036 (2013.01); G03G 15/0935 (2013.01); H04N 1/0009 (2013.01); H04N 1/40056 (2013.01)

(58) Field of Classification Search
CPC ........... G03G 15/0855; G03G 15/0856; G03G 15/0862; G03G 15/0808; G03G 15/0225; G03G 15/04036; G03G 15/0409; G03G 15/0935; G03G 2215/0891; G03G 2215/0894; G03G 2215/0897

USPC .... 399/24, 27, 53, 58, 61–64, 111, 119, 120
See application file for complete search history.

(56) References Cited

U.S. PATENT DOCUMENTS

| 5,649,264 A * | 7/1997 | Domon | G03G 15/0896 |
| | | | 399/27 |
| 6,505,007 B2 * | 1/2003 | Miura | G03G 15/0856 |
| | | | 399/111 |
| 8,774,648 B2 * | 7/2014 | Ogino | G03G 15/553 |
| | | | 399/119 |

FOREIGN PATENT DOCUMENTS

JP 2013-246333 A 12/2013

* cited by examiner

*Primary Examiner* — Hoan H Tran
(74) *Attorney, Agent, or Firm* — Metrolex IP Law Group, PLLC

(57) ABSTRACT

An image forming apparatus according to an embodiment may include a control section that controls operation of the image forming unit; a driving source that drives the image forming unit and drives, based on an instruction of the control section, rotation of a cleaning member whose sliding member passes a gap between a first light transmission window of a first optical path and a second light transmission window of a second optical path in a developer storing section while sliding on the first light transmission window and the second light transmission window. The control section detects, based on a light reception information detected by a light receiving element, a passage timing at which the sliding member passes through the gap, and stops the driving by the driving source based on the passage timing.

8 Claims, 10 Drawing Sheets

IMAGE FORMING APPARATUS

CROSS REFERENCE TO RELATED APPLICATIONS

This application claims priority based on 35 USC 119 from prior Japanese Patent Application No. JP2018-012359 filed on Jan. 29, 2018, entitled "IMAGE FORMING APPARATUS", the entire contents of which are incorporated herein by reference.

BACKGROUND

The disclosure relates to an image forming apparatus and more particularly to an image forming apparatus that detects a toner residual amount based on light transmission.

There has been an image forming apparatus having a configuration in which a toner storing section is provided with a light emitting surface and a light receiving surface arranged across a predetermined space and a toner residual amount is determined according to whether light passes through the space. Further, there has been an image forming apparatus having a configuration in which a wipe member that cleans the light emitting surface and the light receiving surface is provided to reduce occurrence of malfunction due to toner adhering to the light emitting surface and the light receiving surface (see, for example, Japanese Patent Application Publication No. 2013-246333 (page 8, FIG. 8)).

SUMMARY

When the rotation of the wipe member is stopped, for example, if the wipe member stops in contact with the light emitting surface or the light receiving surface, the wipe member having flexibility stops in press contact with the light emitting surface and the light receiving surface for a long time. Toner residual amount detection accuracy is deteriorated by contamination of the light emitting surface or the light receiving surface by resin and an external additive in a developer left between the light emitting surface or the light receiving surface and the wipe member.

An image forming apparatus according to an aspect of one or more embodiments may include: an image forming unit that includes a developer storing section storing therein a developer, and that forms a developer image; an optical path member including a first optical path that includes a first light transmission window and guides light received from a light emitting element to the first light transmission window and a second optical path that includes a second light transmission window and guides light received by the second light transmission window to a light receiving element, the first light transmission window and the second light transmission window being disposed across a predetermined gap in the developer storing section; a cleaning member disposed in the developer storing section and including a rotatably provided rotational shaft and a sliding member that has flexibility, rotates together with the rotational shaft, and passes the gap while sliding on the first light transmission window and the second light transmission window in a predetermined rotation region; a control section that controls operation of at least the image forming unit; a driving source that drives the image forming unit and drives rotation of at least the cleaning member based on an instruction of the control section; and a developer-residual-amount detecting section that causes the light emitting element to emit light based on an instruction of the control section and transmits light reception information based on light reception of the light receiving element to the control section. The control section detects, based on the light reception information, a passage timing at which the sliding member passes through the gap, and stops the driving by the driving source based on the passage timing.

An image forming apparatus according to another aspect of one or more embodiments may include: an image forming unit that includes a developer storing section storing therein a developer, and that forms a developer image; an optical path member including a first optical path that includes a first light transmission window and guides light received from a light emitting element to the first light transmission window and a second optical path that includes a second light transmission window and guides light received by the second light transmission window to a light receiving element, the first light transmission window and the second light transmission window being disposed across a predetermined gap in the developer storing section; a cleaning member disposed in the developer storing section, and configured to be driven to repeatedly pass through the gap to clean the first light transmission window and the second light transmission window; a control section that controls operation of at least the image forming unit; a driving source that drives the image forming unit and drives the cleaning member based on an instruction of the control section; and a developer-residual-amount detecting section that causes the light emitting element to emit light based on an instruction of the control section and transmits light reception information based on light reception of the light receiving element to the control section. The control section stops, after detecting a change of the light reception information that indicates a passage of the cleaning member through the gap based on a predetermined threshold, the driving of the cleaning member by the driving source such that the cleaning member is stopped at a position where the cleaning member is spaced away from the first and second light transmission windows.

According to at least one of the aspects, when the driving of the image forming unit is stopped, it is possible to separate the optical path member and the cleaning member. It is possible to prevent deterioration in detection accuracy by the developer-residual-amount detecting section.

DETAILED DESCRIPTION

Figure 1:
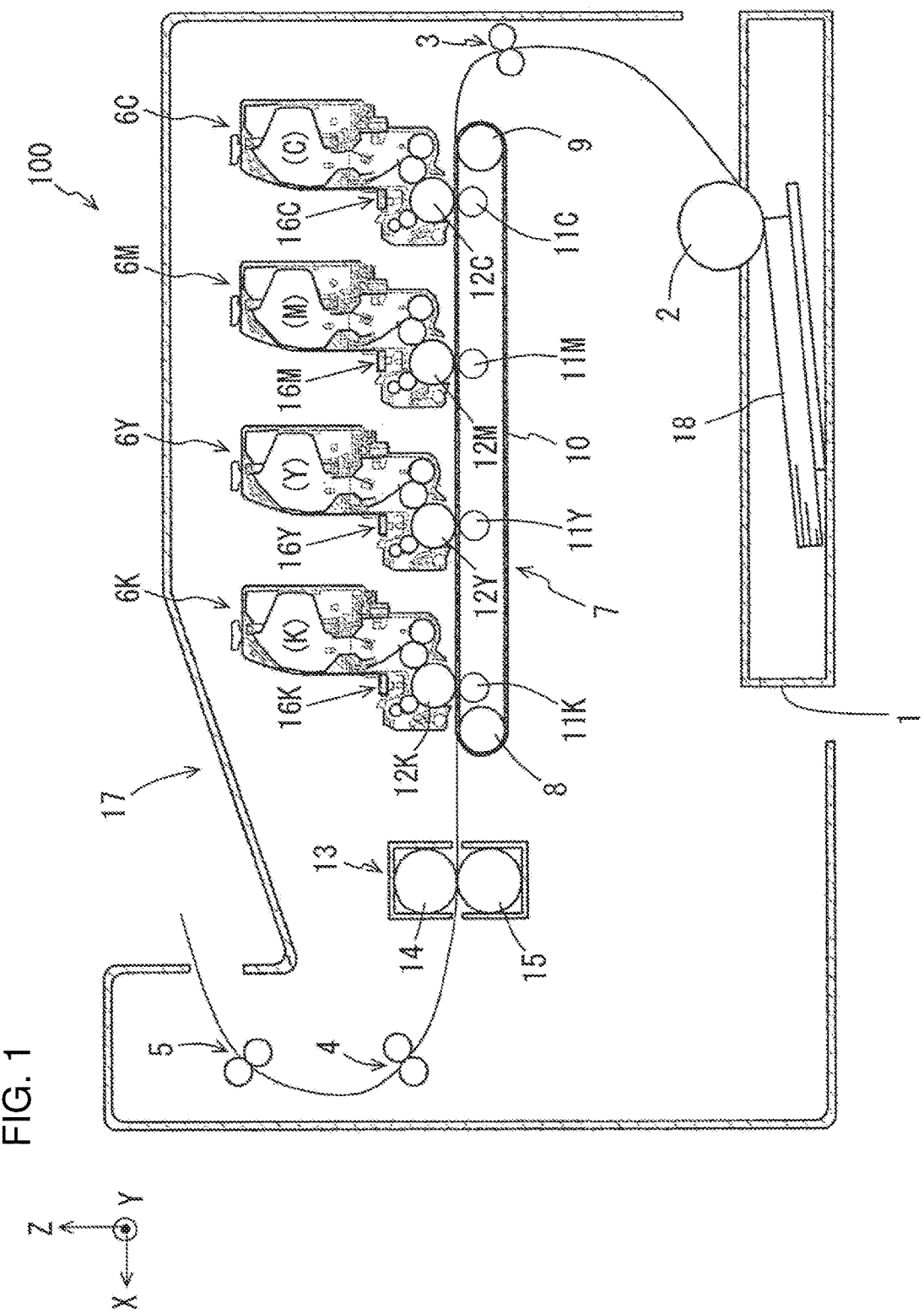
FIG. 1 is a schematic diagram illustrating a view of a main part configuration of an image forming apparatus according to one or more embodiments.

Descriptions are provided hereinbelow for embodiments based on the drawings. In the respective drawings referenced herein, the same constituents are designated by the same reference numerals and duplicate explanation concerning the same constituents is omitted. All of the drawings are provided to illustrate the respective examples only.

FIG. 1 is a diagram illustrating a view of a main part configuration of an image forming apparatus 100 according to one or more embodiments. As illustrated in FIG. 1, the image forming apparatus 100 has a configuration of, for example, a tandem-type color electrophotographic printer. Recording paper 18 serving as recording media is stacked in a medium tray 1. The medium tray 1 is detachably attached to the image forming apparatus 100. A paper feeding roller 2 is driven to rotate by a not-illustrated rotation driving means, pulls out the recording paper 18 at the top, with which the paper feeing roller 2 is in contact, from the medium tray 1, and sequentially lets out the recording paper 18 to a conveying path.

A registration roller pair 3 is disposed in a conveying path on a downstream side of the paper feeding roller 2 in a conveying direction of the recording paper 18. The registration roller pair 3 forces skew of the recording paper 18 and sends the recording paper 18 into an image forming section.

The image forming section includes four image forming units 6C, 6M, 6Y, and 6K (when it is unnecessary to particularly distinguish the image forming units 6C, 6M, 6Y, and 6K, referred to as image forming unit 6) and a transfer section 7 that transfers, with the Coulomb force, toner developed images formed by the image forming units 6 onto the upper surface of the recording paper 18. All of the four image forming units 6 disposed side by side in series are the same in terms of a configuration. Only colors of toners in use, that is, cyan (C), magenta (M), yellow (Y), and black (KI) and operation timings of the image forming units 6 are different.

An image forming unit 6C for cyan (C), an image forming unit 6M for magenta (M), an image forming unit 6Y for yellow (Y), and an image forming unit 6K for black (K) are arrayed in order from an upstream side of a paper conveying direction. The configuration of the image forming units 6 is explained below.

The transfer section 7 includes a transfer belt 10 that electrostatically attracts and conveys the recording paper 18, a drive roller 8 that drives the transfer belt 10, a tension roller 9 that forms a pair with the drive roller 8 and stretches the transfer belt 10, and transfer rollers 11C, 11M, 11Y, and 11 K (when it is unnecessary to particularly distinguish the transfer rollers 11C, 11M, 11Y, and 11K (when it is unnecessary to particularly distinguish the transfer rollers 11C, 11M, 11Y, and 11K, referred to as transfer rollers 11) that are disposed to be opposed to and in press contact with photosensitive drums 12C, 12M, 12Y, and 12K (when it is unnecessary to particularly distinguish the photosensitive drums 12C, 12M, 12Y, and 12K, referred to as photosensitive drums 12) of the image forming units 6 and apply voltages to transfer the toner developed images onto the recording paper 18.

The image forming units 6 and the transfer belt 10 are driven in synchronization with each other to sequentially superimpose and transfer toner images of the respective colors onto the recording paper 18 electrostatically attracted to the transfer belt 10. The recording paper 18, onto which the toner images are transferred by the image forming section in this way, is delivered to a fixing unit 13 that fuses the toner developed images on the recording paper 18 with heat and pressure.

The fixing unit 13 includes a fixing roller 14 that includes a heat source such as a heater and is in contact with the recording paper 18 from above and a backup roller 15 that rotates following the fixing roller 14. The recording paper 18 is conveyed between the heated fixing roller 14 and the backup roller 15, whereby toners adhering to the recording paper 18 are fused by the heat of the fixing roller 14 to fix the toner images on the recording paper 18.

Discharging roller pairs 4 and 5 are disposed in order on a conveying path on the downstream side of the fixing unit 13 in the conveying direction of the recording paper 18. The discharging roller pairs 4 and 5 convey the recording paper 18, on which the toner images are fixed, discharged from the fixing unit 13 and discharges the recording paper 18 to a stacker cover 17.

As X, Y, and Z axes in FIG. 1, the X axis is set in a conveying direction at the time when the recording paper 18 passes the image forming units 6C, 6M, 6Y, and 6K, the Y axis is set in a rotation axis direction of the photosensitive drums 12C, 12M, 12Y, and 12K, and the Z axis is set in a direction orthogonal to the X axis and the Y axis. When the X, Y, and Z axes are illustrated in other figures referred to below, axial directions of the X, Y, and Z axes indicate common directions. That is, drawn portions of the X, Y, and Z axes in the figures indicate disposing directions at the time when drawn portions in the figures configure the image forming apparatus 100 illustrated in FIG. 1. The Z axis is disposed to be substantially the vertical direction.

The four image forming units 6 are the same in terms of a configuration. Therefore, with the image forming unit 6K of black (K) as an example, an internal configuration of the image forming unit 6K is explained with reference to the configuration diagram illustrated in FIG. 2.

The image forming unit 6K is surrounded by a housing 28. The image forming unit 6K includes a toner storing section 30 (or a toner container 30) functioning as a developer storing section (or a developer container 30) that stores toner 29 functioning as a developer, the photosensitive drum 12K that bears a toner developed image, a charging roller 24 that charges the surface of the photosensitive drum 12K, a developing roller 21 that forms a toner developed image with frictional electrification on an electrostatic latent image formed on a charged surface of the photosensitive drum 12K by exposure by an exposing head 16K, a toner supply roller 22 that supplies toner 29 to the developing roller 21, a developing blade 23 that comes into contact with the developing roller 21 to reduce the thickness of the toner 29 on the surface of the developing roller 21, a cleaning blade 25 that scrapes off residual toner remaining on the surface of the photosensitive drum 12K after the transfer, and a toner carrying member 26 for discharging the scraped-off residual toner. Power is transmitted to the drums and the rollers from a driving motor configuring a driving source 60 (see FIG. 5) through a driving transmitting section 61K (see FIG. 5) such as a gear. The drums and the rollers are respectively driven to rotate in arrow directions.

In the image forming unit 6K, an agitating member 31 for agitating the toner 29 near the toner supply roller 22 is disposed. Further, an optical path lens 33 and a cleaning member 32 configuring a toner residual amount detecting mechanism for detecting a toner residual amount of the toner storing section 30 are disposed. The agitating member 31 and the cleaning member 32 are also respectively driven to rotate in arrow directions by the driving source 60 via the driving transmitting section 61K. In an upper part of the image forming unit 6K, a toner cartridge 27 functioning as a developer storing body that supplies the toner 29 is set in a detachable form.

Figure 3:
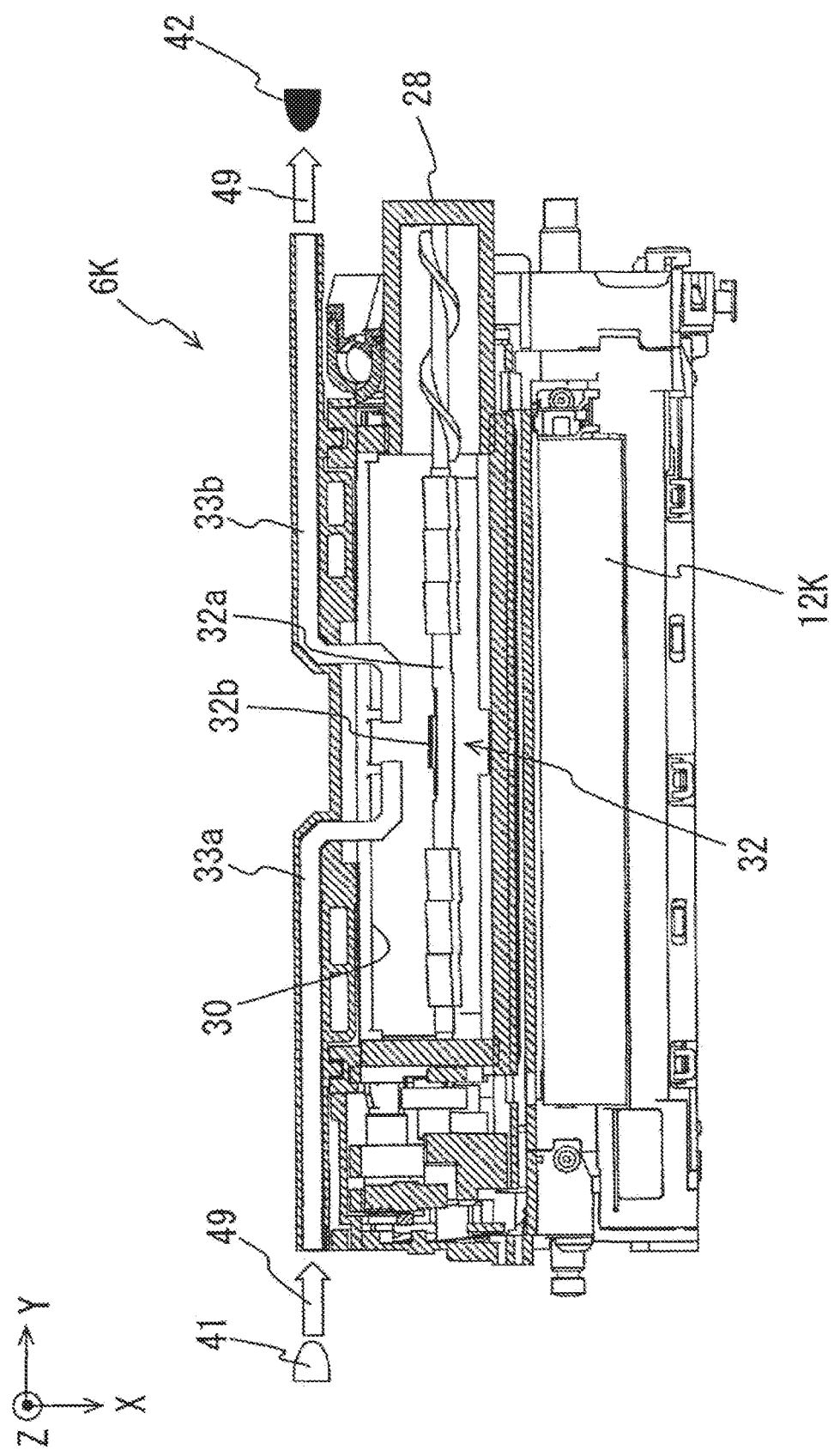
FIG. 3 is a diagram illustrating a view of a part of the image forming unit, from which a toner cartridge is detached, viewed from a plus side of a Z axis.

The configuration of the toner residual amount detecting mechanism is explained. FIG. 3 is a main part configuration diagram of the image forming unit 6K, from which the toner cartridge 27 is detached, viewed from a plus side of the Z axis.

As illustrated in FIG. 3, the optical path lens 33 (see FIG. 4) functioning as an optical path member is configured by a light emission side lens 33a and a light reception side lens 33b. The optical path lens 33 forms an optical path in the toner storing section 30. Light 49 emitted from a light emitting element 41 passes through the light emission side lens 33a functioning as a first optical path and is passed to the light reception side lens 33b functioning as a second optical path in the toner storing section 30. The light 49 passed through the light reception side lens 33b is irradiated on the light reception element 42.

Figure 4:
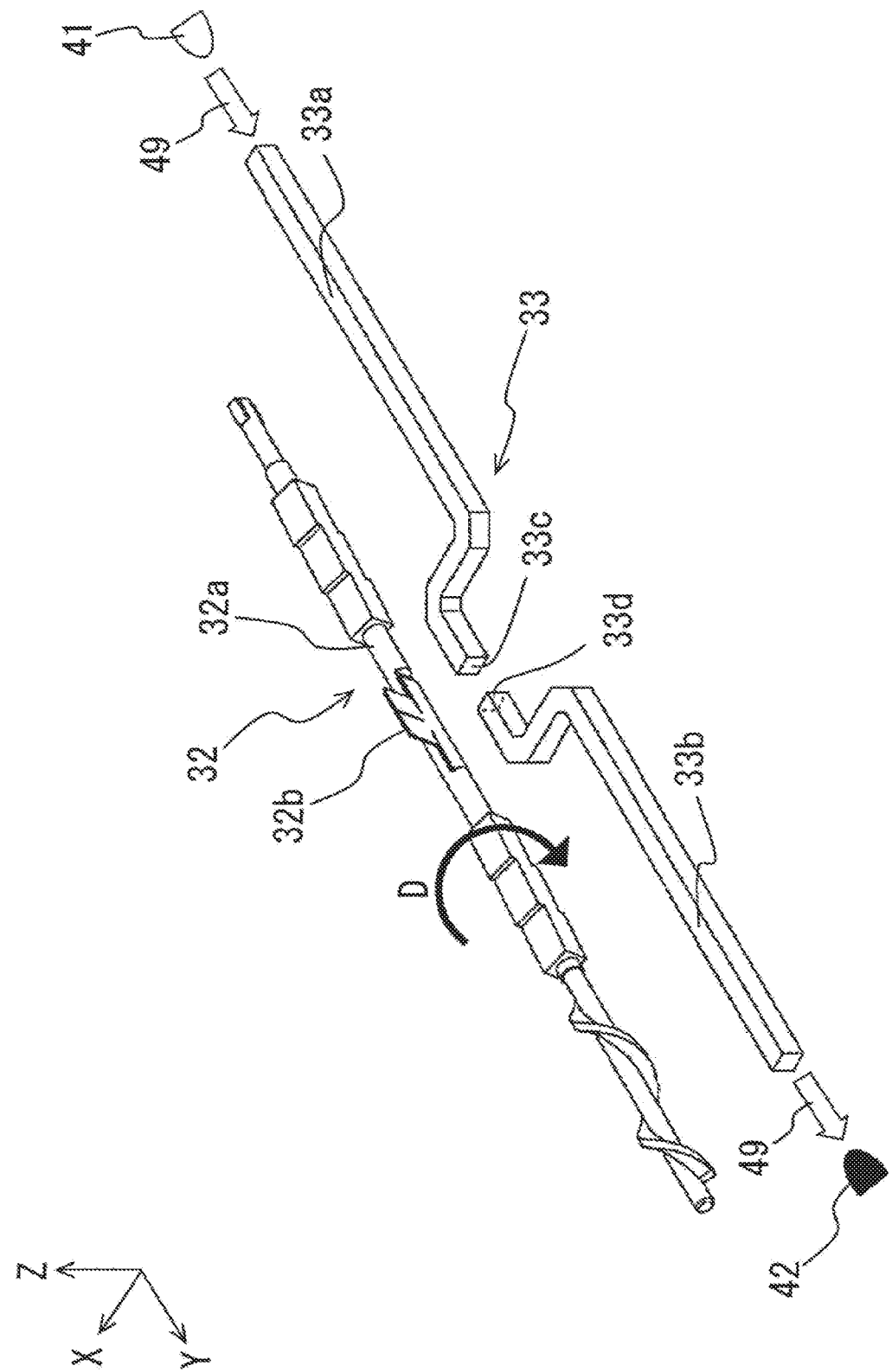
FIG. 4 is a diagram illustrating a perspective view illustrating the configurations of an optical path lens and a cleaning member.

FIG. 4 is a diagram illustrating a perspective view of the configurations of the optical path lens 33 and the cleaning member 32. The optical path lens 33 and the cleaning member 32 are further explained with reference to the drawings.

As illustrated in FIG. 4, the optical path lens 33 is configured from a pair of a light emission side lens 33a and a light reception side lens 33b formed in a crank shape. These lenses are disposed to be separated to form a predetermined interval in the center formed in the crank shape. Consequently, a light emission side transmission window 33c functioning as a first light transmission window, which is one side surface of the light emission side lens 33a on the light emitting element 41 side, and a light reception side transmission window 33d functioning as a second light transmission window, which is one side surface of the light reception side lens 33b on the light receiving element 42 side, are opposed at a predetermined interval. As illustrated in FIG. 3, the center formed in the crank shape of the optical path lens 33 is located in the toner storing section 30. The optical path lens 33 detects a toner residual amount in the toner storing section 30 as explained below.

The cleaning member 32 includes a wipe shaft 32a functioning as a rotational shaft and a wipe member 32b functioning as a sliding member disposed integrally with the wipe shaft 32a in substantially the center of the wipe member 32b. The wipe shaft 32a and the wipe member 32b integrally rotate in an arrow D direction. At this time, in a rotating process, the wipe member 32b formed by a PTFE film having flexibility moves, in a bent state, in a gap between the light emission side transmission window 33c and the light reception side transmission window 33d opposed to each other. Both end portions of the wipe member 32b respectively slide on the light emission side transmission window 33c and the light reception side transmission window 33d to thereby clean the window surfaces.

The wipe member 32b is explained as the PTFE film. However, the wipe member 32b is usable if the wipe member 32b is a member having flexibility such as PET film or a Kapton film. The light emitting element 41 is explained using an infrared LED as an example. The light receiving element 42 is explained using a phototransistor as an example. However, the light emitting element 41 and the light receiving element 42 are not limited thereto.

Figure 5:
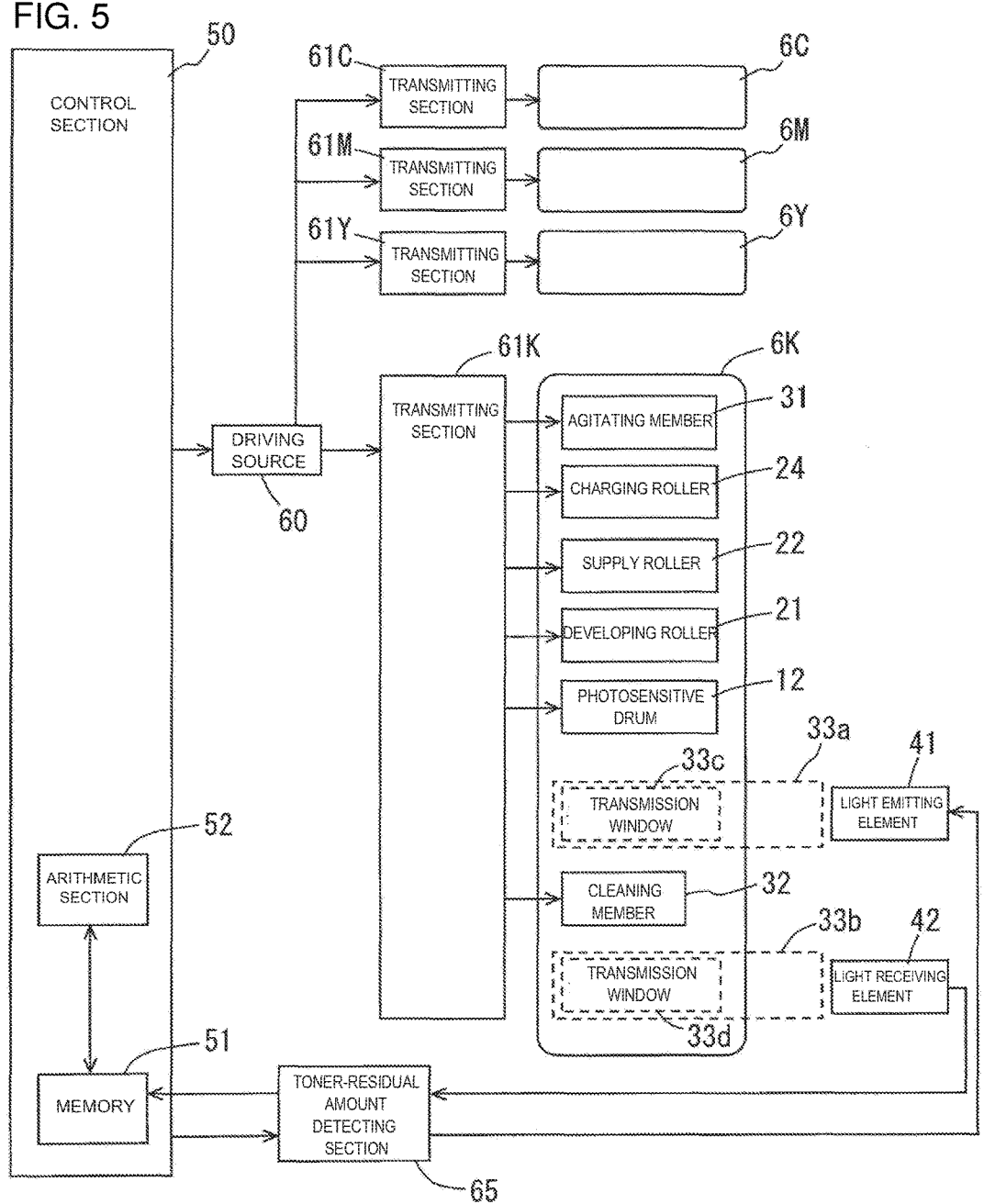
FIG. 5 is a block diagram illustrating a view of a main part configuration of a control system of the image forming apparatus.

FIG. 5 is a block diagram illustrating a view of a main part configuration of a control system of the image forming apparatus 100. FIG. 5 illustrates, in particular, a main part configuration of the control system that performs stop control of the image forming units 6. The configuration of the control system that performs the stop control based on a toner residual amount detection signal (a light reception voltage) at a printing end time is explained with reference to FIG. 5.

In FIG. 5, a control section 50 includes a memory 51 and an arithmetic section 52. The control section 50 is a control section that controls the entire printing operation of the image forming apparatus 100. The toner-residual-amount detecting section 65 functioning as a developer-residual-amount detecting section receives a command from the control section 50, causes the light emitting element 41 to emit light, and receives a light reception signal from the light receiving element 42. The memory 51 stores light reception information of the light reception signal received by the toner-residual-amount detecting section 65. The arithmetic section 52 executes an arithmetic operation based on the light reception information stored in the memory 51 and returns a result of the arithmetic operation to the memory 51. The operations of the toner-residual-amount detecting section 65, the arithmetic section 52, and the memory 51 are further explained below.

The driving source 60 is configured by a driving motor. The driving source 60 drives the image forming unit 6C via a driving transmitting section 61C based on a command from the control section 50. Similarly, the driving source 60 drives the image forming unit 6M via a driving transmitting section 61M, drives the image forming unit 6Y via a driving transmitting section 61Y, and drives the image forming unit 6K via a driving transmitting section 61K. The driving transmitting sections 61 (when it is unnecessary to particularly distinguish the driving transmitting sections 61C, 61M, 61Y, and 61 K, referred to as driving transmitting sections 61) are configured by gear trains and the like.

Figure 2:
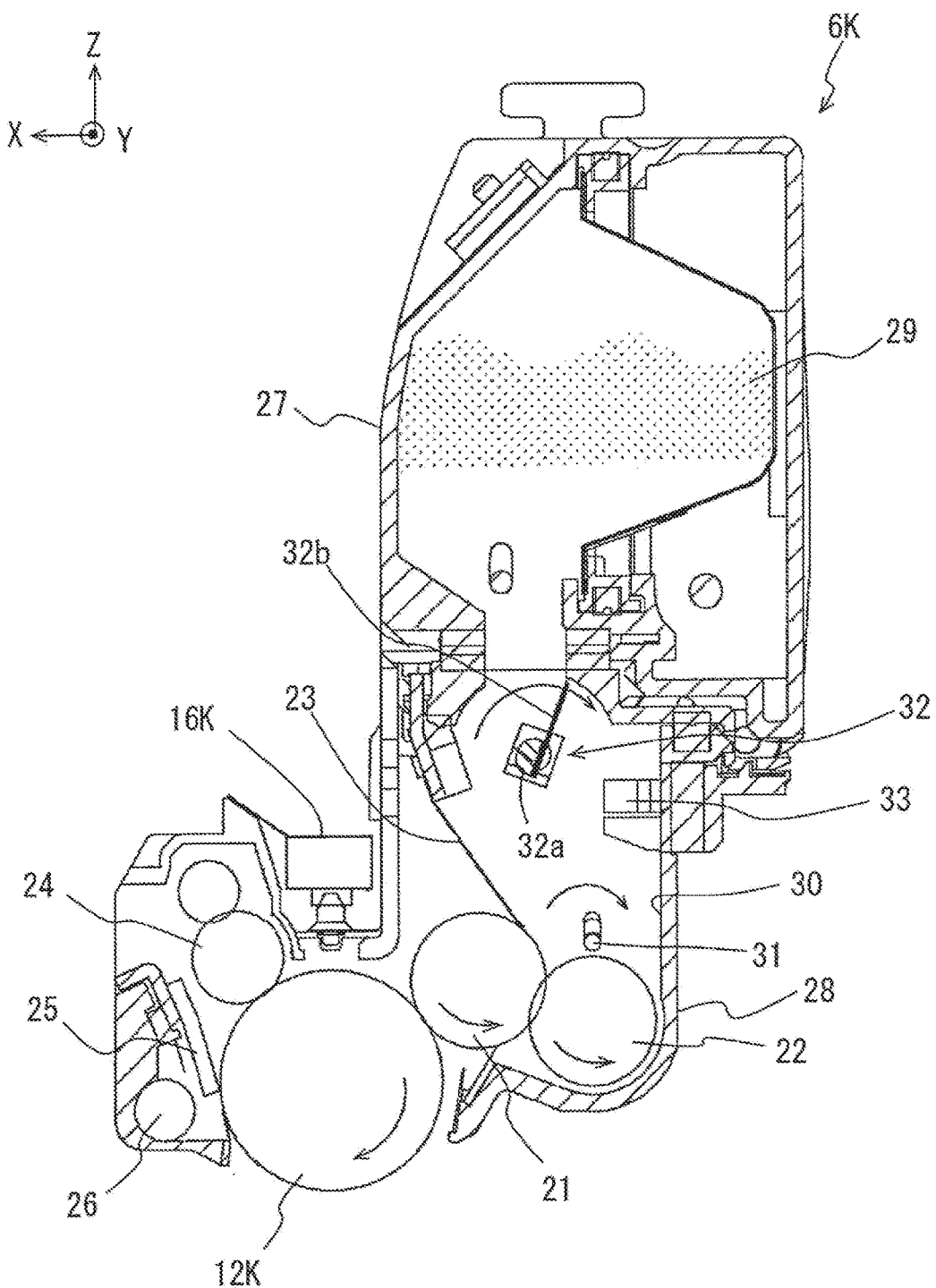
FIG. 2 is a diagram illustrating a view of an internal configuration of a main part of an image forming unit.

Since a relation between the driving transmitting sections 61 and the image forming units 6 are common, a relation between the driving transmitting section 61K corresponding to black (K) and the image forming unit 6K is further explained as an example. The driving transmitting section 61K receives a driving force from the driving source 60, drives the photosensitive drum 12K illustrated in FIG. 2, further transmits driving to the developing roller 21, the supply roller 22, the charging roller 24, the wipe shaft 32a of the cleaning member 32, and the agitating member 31, and rotates the rotating members respectively in the arrow directions (FIG. 2).

One driving source 60 is provided for a plurality of (four) image forming units 6 to transmit driving. However, as explained below, one or more driving sources may be provided for each of the image forming units 6.

In the configuration explained above, first, an overview of a printing operation of the image forming apparatus 100 is explained with reference to FIGS. 1 and 2.

When a printing command is issued from the control section 50 (FIG. 5), the image forming apparatus 100 conveys the recording paper 18 to the transfer belt 10 with the paper feeding roller 2 and the registration roller pair 3. On the other hand, the image forming units 6 form, with exposure by the exposing heads 16, latent images on the circumferential surfaces of the photosensitive drums 12 charged by the charging rollers 24 and develop the latent images with the toner 29 in a developing process explained below.

Developed toner images reach parts opposed to the transfer belt 10 according to the rotation of the photosensitive drums 12 and transferred onto the recording paper 18 by the transfer belt 10 and the transfer rollers 11. The recording paper 18 having the toner images transferred thereon are heated and pressurized by the fixing unit 13 and the toner images are fixed on the recording paper 18. Thereafter, the recording paper 18 is discharged onto the stacker cover 17 by the discharge roller pairs 4 and 5.

The developing process by the image forming unit 6 is further explained mainly with reference to FIG. 2. The image forming unit 6 is driven by the driving source 60 controlled by the control section 50. That is, the image forming unit 6 is driven by the driving source 60 controlled by the control section 50. That is, the photosensitive drum 12, the developing roller 21, and the supply roller 22 are respectively driven to rotate in arrow directions illustrated in FIG. 2 via the driving transmitting section 61. Further, the agitating member 31 disposed near the supply roller 22 and the wipe shaft 32a of the cleaning member 32 are respectively driven to rotate in arrow directions illustrated in FIG. 2. At this time, the cleaning member 32 performs agitation and conveyance of the toner 29 together with the cleaning of the optical path lens 33 explained above.

At this time, the toner 29 is supplied to the development roller 21 by the supply roller 22. The toner 29 supplied to the developing roller 21 is reduced in thickness by the developing blade 23. The toner 29 is transferred to an electrostatic latent image formed on the surface of the photosensitive drum 12 by exposure by the exposing head 16 and develops the electrostatic latent image. When a toner image on the photosensitive drum 12 is transferred onto the recording paper 18 (FIG. 1) by the transfer belt 10 and the transfer rollers 11 (FIG. 1), residual toner remaining on the photosensitive drum 12 after the transfer is scraped off by the cleaning blade 25 and conveyed to a not-illustrated predetermined residual toner storage section by the toner carrying member 26.

A toner residual amount detection system formed by the optical path lens 33, the light emitting element 41, the light receiving element 42, the cleaning member 32, and the like and the operations of the optical path lens 33, the light emitting element 41, the light receiving element 42, the cleaning member 32, and the like are explained with reference to FIGS. 3 to 7.

The toner-residual-amount detecting section 65 (FIG. 5) is connected to the light emitting element 41 and the light receiving element 42. When receiving a control signal from the control section 50, the toner-residual-amount detecting section 65 supplies a predetermined electric current to the light emitting element 41 and causes the light emitting element 41 to emit light. Consequently, the light emitting element 41 is controlled to always emit light during the operation of the image forming unit 6K. On the other hand, the light receiving element 42 has a characteristic that an electric current flowing according to a received light amount changes. The light receiving element 42 is configured to output, to the memory 51, a light reception voltage near 5 V when there is almost no light reception amount in the toner-residual-amount detecting section 65 and a light reception voltage near 0 V when the light reception amount is the largest in the toner-residual-amount detecting section 65.

As illustrated in FIG. 4, the light 49 emitted from the light emitting element 41 passes through the light emission side lens 33a, the light emission side transmission window 33c, the light reception side transmission window 33d, and the light reception side lens 33b in this order. The light receiving element 42 feeds an electric current corresponding to a light reception amount, whereby the toner-residual-amount detecting section 65 outputs a light reception voltage, which changes according to the light reception amount, to the memory 51. The memory 51 stores a temporal change of the light reception voltage.

The light emitting elements 41, the light receiving elements 42, and the toner-residual-amount detecting sections 65 are included in the other image forming units 6C, 6M, and 6Y in common. The light emitting elements 41, the light receiving elements 42, and the toner-residual-amount detecting sections 65 are configured to operate in the same manner and output light reception voltages to the memory 51. Therefore, the memory 51 stores the light reception voltages of the four image forming units 6 and supplies voltage data of the light reception voltages to the arithmetic section 52 according to necessity.

In the above explanation, the toner-residual-amount detecting section 65 is included in each of the four image forming units 6. However, it is also possible to configure one toner-residual-amount detecting section 65 to manage the respective light emitting elements 41 and the respective light receiving elements 42 of the four image forming units 6.

Figure 6A:
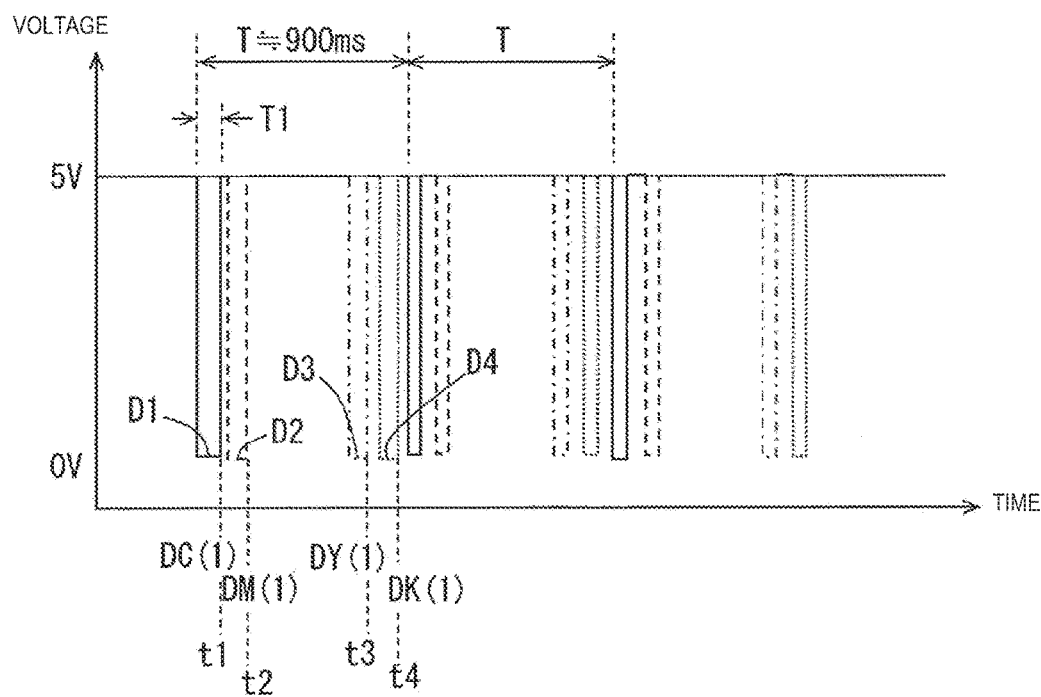
FIGS. 6A and 6B are diagrams illustrating toner residual amount detection waveforms processed based on light reception voltages output according to light reception amounts of respective light receiving elements in four image forming units, FIG. 6A illustrating a toner-full state and FIG. 6B illustrating a toner-low state.
Figure 6B:
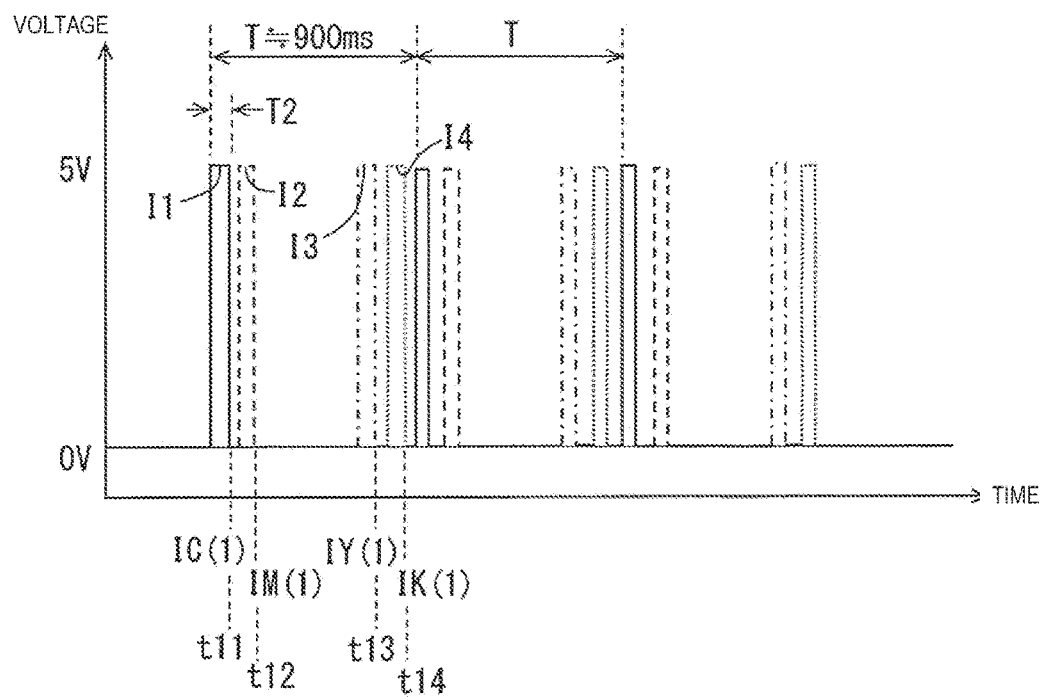
Figure 7A:
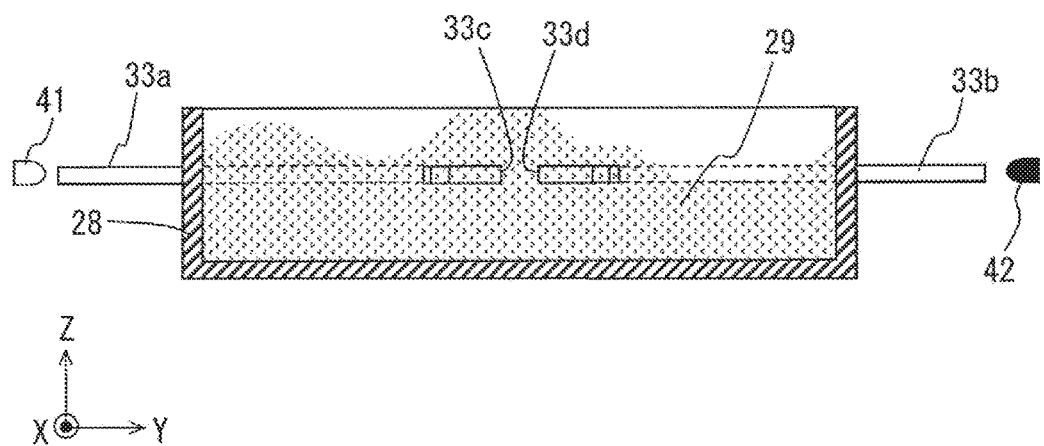
FIGS. 7A and 7B are operation explanatory diagrams schematically illustrating views of a relation between a toner residual amount in a toner storing section and the optical path lens in the image forming unit, FIG. 7A illustrating the toner-full state and FIG. 7B illustrating the toner-low state.
Figure 7B:
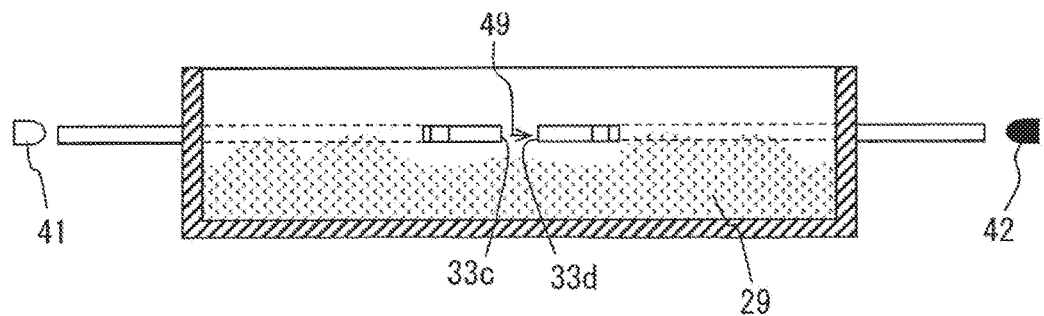

FIGS. 6A and 6B are diagrams illustrating toner residual amount detection waveforms processed on light reception voltages output according to light reception amounts of the respective light receiving elements 42 in the four image forming units 6. A voltage is plotted on the vertical axis and a time is plotted on the horizontal axis. FIGS. 7A and 7B are operation explanatory diagrams schematically illustrating views of relations between a toner residual amount in the toner storing section 30 of the image forming unit 6 and the optical path lens 33. FIG. 7A illustrates a toner-full state where the toner residual amount is determined as full. FIG. 7B illustrates a toner-low state where the toner residual amount is determined as little.

FIG. 6A is a toner residual amount detection waveform formed by combining and processing light reception voltages stored when toner storing sections 30C, 30M, 30Y, and 30K of the four image forming units 6 are in the toner-full state. As illustrated in FIG. 7A equivalent to the toner-full state, when the upper surface of the toner 29 is present above the optical path lens 33 in the vertical direction, the toner 29 is present between the light emission side transmission window 33c and the light reception side transmission window 33d and blocks passage of the light 49. Therefore, a light reception amount of the light receiving element 42 is small and a light reception voltage has a voltage value near 5 V.

In a short light amount increase time T1 in which the wipe member 32b (FIG. 4) passes between an opposed pair of the transmission windows 33c and 33d of the optical path lens 33 and performs wiping, the transmission windows 33c and 33d are cleaned and the toner 29 is pushed away by the wipe member 32b. Therefore, the light 49 passes between the transmission windows 33c and 33d, a light reception amount of the light receiving element 42 temporarily increases, and a light reception voltage is near 0 V. A rotation cycle T of the wipe shaft 32a is set to T≈900 [ms]. Consequently, the light amount increase time T1 is T1≈70 [ms].

Therefore, when the light reception voltage is near 5 V, the control section 50 determines that the image forming unit 6 that outputs the light reception voltage is in toner-full state. When the voltage further drops to near 0 V in a pulse-like manner, the control section 50 determines that the wipe member 32b passes the optical path lens 33 near the voltage of 0 V.

The toner residual amount detection waveform illustrated in FIG. 6A is obtained by combining output voltage waveforms of the image forming units 6 in the toner-full state. D1 is equivalent to a light amount increase period of the image forming unit 6C, D2 is equivalent to a light amount increase period of the image forming unit 6M, D3 is equivalent to a light amount increase period of the image forming unit 6Y, and D4 is equivalent to a light amount increase period of the image forming unit 6K. FIG. 6A illustrates a state where D1 to D4 occur one after another in the rotation cycles T according to the rotation of the wipe shaft 32a.

FIG. 6B is a toner residual amount detection waveform obtained by combining and processing light reception voltages stored when the toner storing sections 30C, 30M, 30Y, and 30K of the four image forming units 6 are in the toner-low state. As illustrated in FIG. 7B equivalent to the toner-low state, when the upper surface of the toner 29 is present below the optical path lens 33 in the vertical direction, the toner 29 is absent and the light 49 passes between the light emission side transmission window 33c and the light reception side transmission window 33d. Therefore, a light reception amount of the light receiving element 42 is large. The light reception voltage has a voltage value near 0 V.

In a short light amount decrease time T2 (T2≈90 [ms]) in which the wipe member 32b (FIG. 4) passes between an opposed pair of the transmission windows 33c and 33d of the optical path lens 33 and performs wiping, the light 49 cannot pass because the transmission windows 33c and 33d are blocked by the wipe member 32b. A light reception amount of the light receiving element 42 temporarily decreases and the light reception voltage drops to near 5 V.

Therefore, when the light reception voltage is near 0 V, the control section 50 determines that the image forming unit 6 that outputs the light reception voltage is in the toner-low state. When the voltage further rises to near 5 V in a pulse-like manner, the control section 50 determines that the wipe member 32b passes the optical path lens 33 near the voltage 5 V.

The toner residual amount detection waveform illustrated in FIG. 6B is obtained by combining output voltage waveforms of the image forming units 6 in the toner-low state. I1 is equivalent to a light amount decrease period of the image forming unit 6C, I2 is equivalent to a light amount decrease period of the image forming unit 6M, I3 is equivalent to a light amount decrease period of the image forming unit 6Y, and I4 is equivalent to a light amount decrease period of the image forming unit 6K. FIG. 6B illustrates a state where I1, I2, I3, and I4 occur one after another in the rotation cycles T according to the rotation of the wipe shaft 32a.

Next, the operation of a driving stop process of the image forming units 6 at a printing end time is explained. As a characteristic in this driving stop process, stop control for stopping the driving of the image forming units 6 uses, as a stop timing, a timing based on a toner residual amount detection waveform.

FIGS. 6A and 6B present the toner residual amount detection waveforms obtained by combining the output voltage waveforms based on the light reception voltages in a state where all the image forming units 6 are in the toner-full state or the toner-low state. However, in some case, some of the image forming units 6 are in the toner-full state and the other some image forming units 6 are in the toner-low state. However, the stop control described herein is also applicable to such a case as explained bellow.

When the driving of the image forming units 6 is stopped in a printing end or the like, the control section 50 issues a stop command to the driving source 60 at timings of times t1 to t4, which are end timings of the light amount decrease periods D1 to D4 illustrated in FIG. 6A, or timings of times t11 to t14, which are end timings of the light amount increase periods I1 to I4 illustrated in FIG. 6B, in the toner residual amount detection waveforms illustrated in FIGS. 6A and 6B.

By stopping the driving of the image forming units 6 at such timings, it is possible to stop the driving in a state immediately after the wipe member 32b (FIG. 4) ends contact by cleaning with the light emission side transmission window 33c and the light reception side transmission window 33d of the optical path lens 33 and separates from the light emission side transmission window 33c and the light reception side transmission window 33d.

"Slip" due to inertia of the cleaning member 32 including the wide shaft 32a and the wipe member 32b is examined. When the image forming units 6 being driven are stopped to be driven, a slight amount of "slip" occurs because of inertia during the driving. Therefore, there is a concern that the wipe member 32b rotates even during the occurrence of the "slip" and comes into contact with the optical path lens 33 again.

Figure 8:
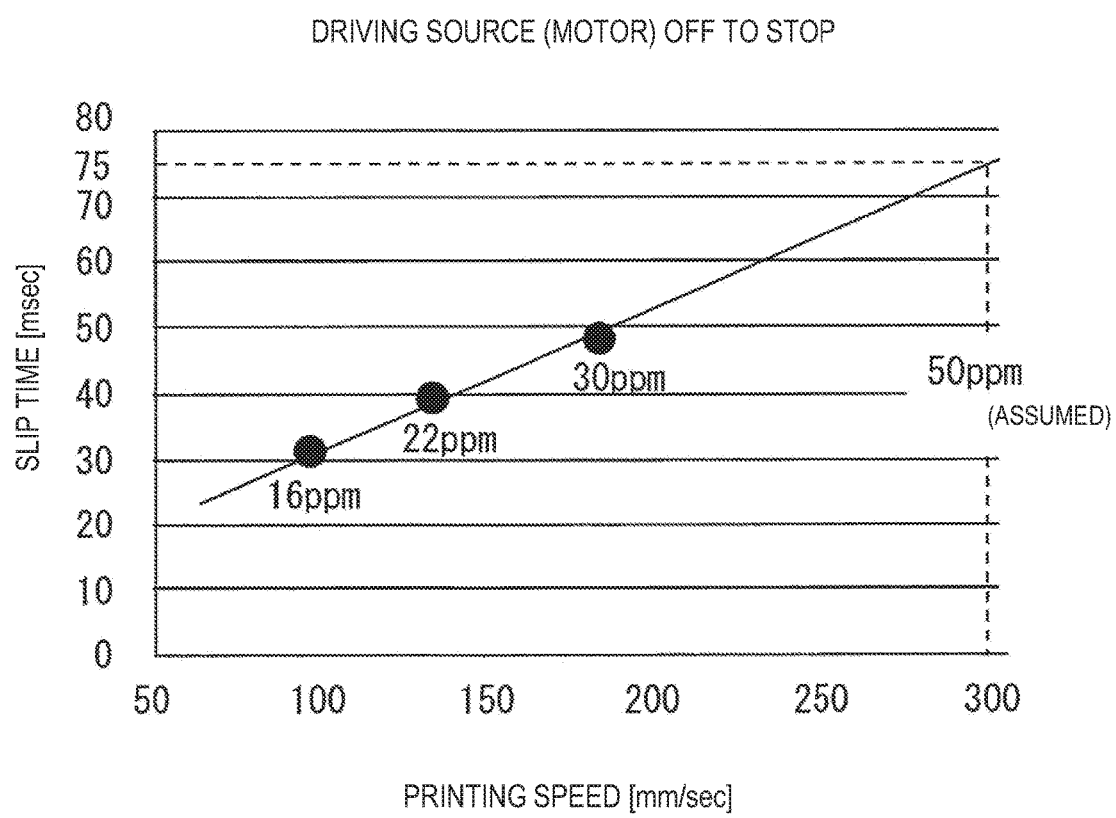
FIG. 8 is a graph illustrating a relation between a "slip" time and printing speed from when a driving source receives a driving stop command until the cleaning member is completely stopped in the image forming apparatus.

FIG. 8 is a graph illustrating a relation between a "slip" time from when the driving source 60 (FIG. 5) receives a driving stop command until the cleaning member 32 is completely stopped and linear speed of the photosensitive drums 12 of the image forming units 6 in the image forming apparatus 100. As the linear speed, that is, printing speed increases, the "slip" time tends to be long. However, even if printing speed of 50 [ppm] is assumed based on measurement values of printing speeds of 16 ppm, 22 ppm, and 30 ppm, the "slip" time is approximately 75 [msec].

Therefore, for example, as in a modification 1 (see FIG. 10) explained below, in the case of a configuration in which driving sources are individually prepared in the image forming units 6 and the driving sources can be individually stopped at the timings of the times t1 to t4 or the times t11 to t14, even if the "slip" time is approximately 75 [msec] assuming the printing speed of 50 [ppm], the "slip" time is less than 1/10 of the rotation cycle T (≈900 [msec]) of the wipe shaft 32a. Therefore, the above concern, that is, the re-contact due to the "slip" may be considered absent.

However, since the plurality of image forming units 6 are driven by one driving source 60 (FIG. 5), it is necessary to stop the driving of the driving source 60 considering phase differences of detection waveforms of the image forming units 6. This is because, depending on the phase differences, there is a concern that the optical path lens 33 and the wipe member 32b stop in a state where optical path lens 33 and the wipe member 32b are in contact by the "slip". A driving stop method for the driving source 60 according to one or more embodiments is explained below.

Figure 9:
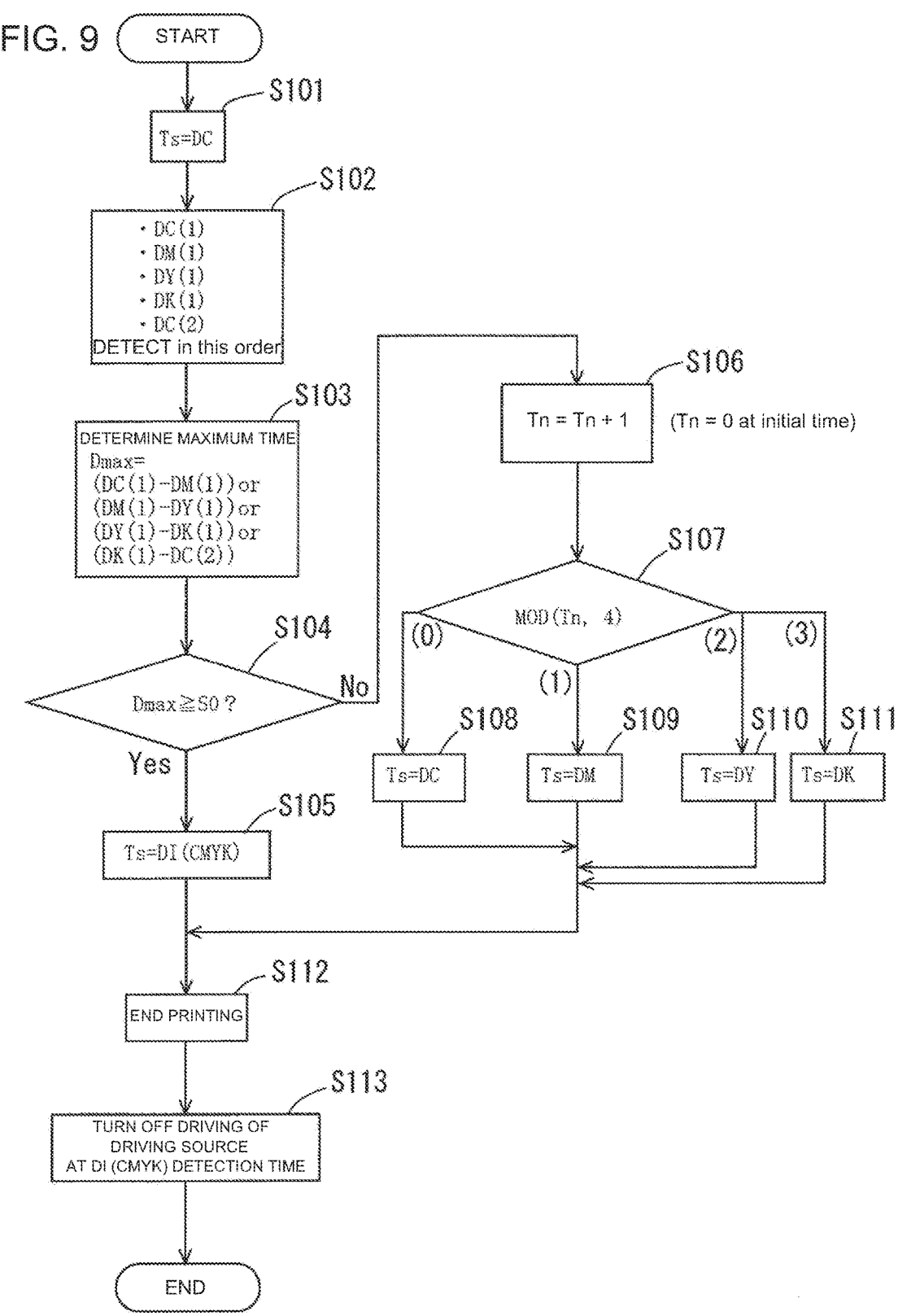
FIG. 9 is a flowchart illustrating a procedure for a driving stop of the driving source executed by a control section.

FIG. 9 is a flowchart illustrating a procedure for a driving stop of the driving source 60 executed by the control section 50. A driving stop method for the driving source 60 is explained with reference to the flowchart.

First, signs described in the toner residual amount detection waveforms in FIGS. 6A and 6b are explained. Detection timing DC(1) is equivalent to the end timing (the time t1) of the light amount decrease period D1 detected in a first cycle of the wipe shaft 32a in the image forming unit 6C.

Detection timing DM(1) is equivalent to the end timing (the time t2) of the light amount decrease period D2 detected in the first cycle of the wipe shaft 32a in the image forming units 6M.

Detection timing DY(1) is equivalent to the end timing (the time t3) of the light amount decrease period D3 detected in the first cycle of the wipe shaft 32a in the image forming unit 6Y.

Detection timing DK(1) is equivalent to the end timing (the time t4) of the light amount decrease period D4 detected in the first cycle of the wipe shaft 32a in the image forming unit 6K.

The detection timings DC(2), DM(2), DY(2), and DK(2) are equivalent to the end timings in the second cycle of the wipe shafts. When the detection timings are generally referred to, the detection timings are simply referred to as DC, DM, DY, and DK.

Detection timing IC (1) is equivalent to the end timing (the time t11) of the light amount increase time I1 detected in the first cycle of the wipe shaft 32a in the image forming unit 6C.

Detection timing IM (1) is equivalent to the end timing (the time t12) of the light amount increase period I2 detected in the first cycle of the wipe shaft 32a in the image forming unit 6M.

Detection timing IY(1) is equivalent to the end timing (the time t13) of the light amount increase period 13 detected in the first cycle of the wipe shaft 32a in the image forming unit 6Y.

The detection timing IK(1) is equivalent to the end timing (the time t14) of the light amount increase period 14 detected in the first cycle of the wipe shaft 32a in the image forming unit 6K.

The detection timings IC(2), IM(2), IY(2), and IK(2) are equivalent to the end timings in the second cycle of the wipe shafts. When the detection timings are generally referred to, the detection timings are simply referred to as IC, IM, IY, and 1K.

For example, in the image forming unit 6C, as the detection timing DC and the detection timing IC, according to a state of toner, the detection timing DC is detected in the toner-full state and the detection timing IC is detected in the toner-low state. These detection timings are nearly coinciding timings in the same time series. Therefore, in the following explanation, it is assumed that the detection timings DC, DM, DY, and DK are detected in the image forming units 6. However, in the case of toner-low, detection timings are IC, IM, IY, and 1K.

Step S101: In this step, as a reference timing signal Ts for stopping the driving source 60, the detection timing DC of the image forming unit 6C is tentatively set and stored in the memory 51.

Step S102: In this step, the detection timings DC(1), DM(1), DY(1), DK(1), and DC(2) are detected in this order. Timing information (i.e. times) of these detection timings is stored in the memory 51. However, although the order of the detection timings detected is described according to the order of the detection timings illustrated in FIGS. 6A and 6B, the order of the detection timings is determined in practice according to the initial positions of the wipe members 32b of the image forming units 6.

Step S103: In this step, the arithmetic section 52 calculates, based on the detection timing information stored in the memory 51, time intervals among detection times adjacent to one another, that is, DM(1)-DC(1), DY(1)-DM(1), DK(1)-DY(1), and DC(2)-DK(1), specifies a maximum value Dmax of the time intervals, and stores the maximum value Dmax in the memory 51.

Step S104: In this step, the control section 50 determines which is larger, the maximum value Dmax or the threshold S0. The threshold is set to S0=150 [ms] taking into account a margin twice as large as a "slip" amount of 75 [msec] at the time of the printing speed of 50 [ppm].

When it is determined in step S104 that the maximum value Dmax>threshold S0, the control section 50 proceeds to step S105.

Step S105: In this step, the control section 50 specifies, as DI(CMYK), specific detection timing which is a start point of an interval between the detection timings corresponding to a time interval of the maximum value Dmax, updates the reference timing signal Ts for stopping the driving source 60 from DC to DI(CMYK), and sets the reference timing signal Ts as Ts=DI(CMYK).

For example, when the time interval of the maximum value Dmax is the time interval (DY(1)-DM(1)) as illustrated in FIGS. 6A and 6B, the detection timing DM as the start point is the specific detection timing DI(CMYK) and Ts=DM.

Step S112: This step is a step of ending a printing operation.

Step S113: In this step, the control section 50 detects the detection timing DI(CMYK) (equivalent to DM in the example illustrated in FIGS. 6A and 6B) after the end of the printing operation and, at the same time, outputs a driving stop command to the driving source 60.

In this case, at least in the image forming unit of the detection timing DI(CMYK) (equivalent to the image forming unit 6Y in the example illustrated in FIGS. 6A and 6B) and the counterpart image forming unit that generates the maximum value Dmax (in the example illustrated in FIGS. 6A and 6B, equivalent to the image forming unit 6Y), the cleaning members 32 of the image forming units stop rotation in positions where the wipe members 32b of the cleaning members 32 and the optical path lens 33 are apart.

When it is determined in step S104 that the maximum value Dmax<the threshold S0, the control section 50 proceeds to step S106.

Step S106: In this step, the control section 50 adds 1 to a reference signal identification count Tn and stores the reference signal identification count Tn in the memory 51. The count is counted up every time this flow starts. An initial value of the reference signal identification count Tn is Tn=0.

Step S107: In this step, the control section 50 determines, according to a value of a remainder of a quotient obtained by dividing Tn by 4, a step to which the control section 50 proceeds next. That is, when the remainder is 0, the control section 50 proceeds to step S108. When the remainder is 1, the control section 50 proceeds to step S109. When the remainder is 2, the control section 50 proceeds to step S110. When the remainder is 3, the control section 50 proceeds to step S111.

Step S108: In this step, the control section 50 sets Ts=DC and proceeds to step S112.

Step S109: In this step, the control section 50 sets Ts=DM and proceeds to step S112.

Step S110: In this step, the control section 50 sets Ts=DY and proceeds to step S112.

Step S111: In this step, the control section 50 sets Ts=DK and proceeds to step S112.

In steps S106 to S111 explained above, when the maximum value Dmax of the time intervals among the detection timings DM(1)-DC(1), DY(1)-DM(1), Dk(1)-DY(1), and DC(2)-DK(1) is not sufficiently larger than the "slip" amount, the stop timing of the driving source 60 is changed among the detection timings in turn every time the driving source 60 is stopped. Consequently, the wipe member 32b of at least any one of the four image forming units 6C, 6M, 6Y, and 6K in turn stops in a position away from the optical path lens 33. Consequently, a risk that the wipe member 32b stops in contact with the optical path lens 33 can be distributed among the image forming units 6 of the colors in such a manner that the risk taker is changed among the image forming units 6 in turn every time one printing operation ends.

In the above one or more embodiments, the setting method for the reference timing signal Ts is selected according to the determination in step S104. However, the control section 50 may be configured to directly shift from step S103 to step S106 without performing the determination in step S104.

In the above one or more embodiments, the example is explained in which the one driving source 60 drives the four image forming units 6. However, not only this, but one driving source may drive a plurality of image forming units.

(Modification 1)

Figure 10:
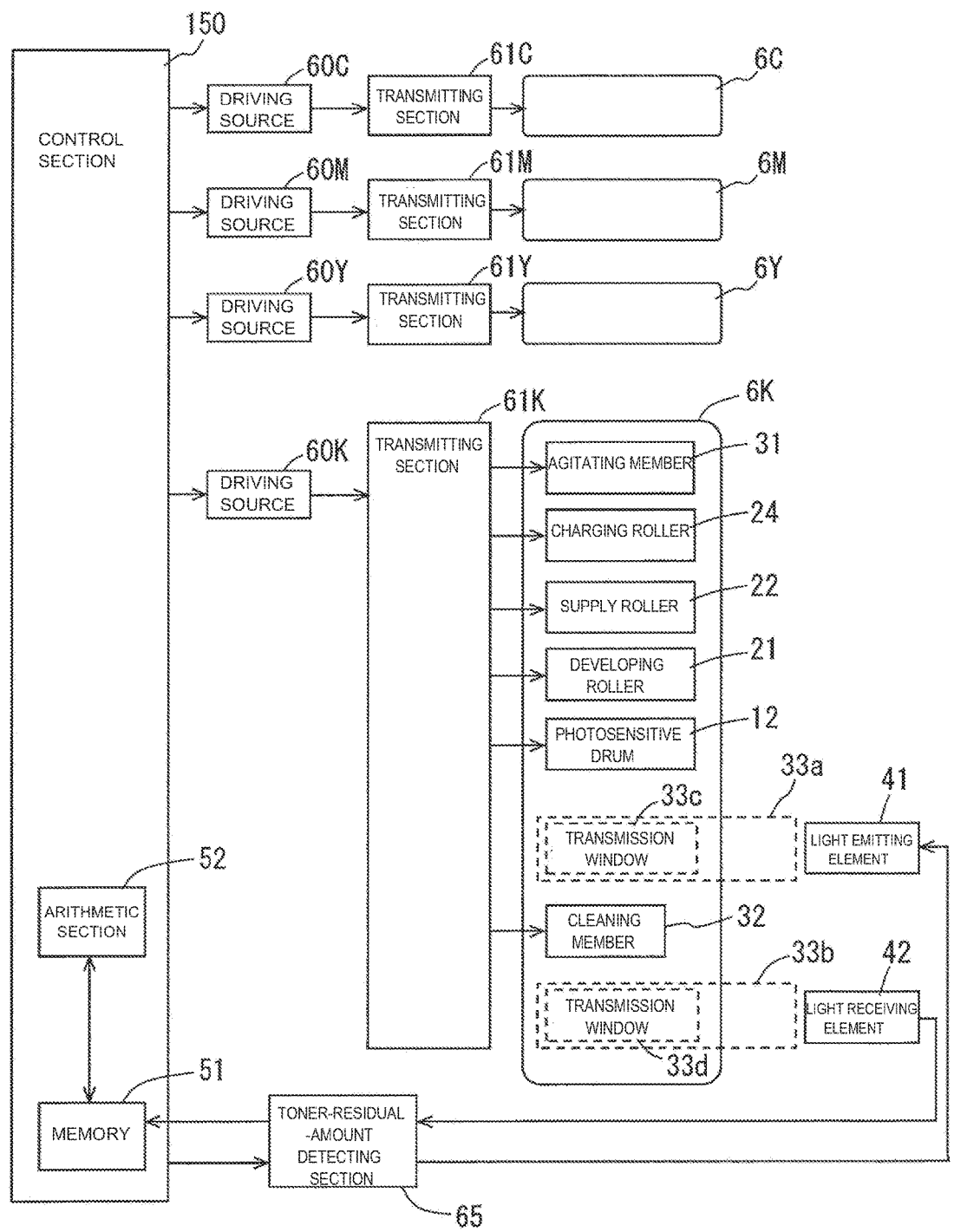
FIG. 10 is a block diagram illustrating a view of a main part configuration of a control system of an image forming apparatus according to modification 1.

FIG. 10 is a block diagram illustrating a view of a main part configuration of a control system of an image forming apparatus according to modification 1. FIG. 10 illustrates, in particular, a main part configuration of a control system that performs stop control of the image forming units 6 according to the disclosure.

The control system in modification 1 is different from the control system in the embodiment illustrated in FIG. 5 in that driving sources 60C, 60M, 60Y, and 60K of the image forming units 6 are respectively individually prepared and control of a control section 150 corresponding thereto is partially different.

Since the driving sources 60C, 60M, 60Y, and 60K are individually prepared in the image forming units 6, the control section 150 stops the driving source 60C at the times t1 to t4 or the times t11 to t14, that is, the detection timing DC illustrated in FIGS. 6A and 6B, stops the driving source 60M at the detection timing DM, stops the driving source 60Y at the detection timing DY, and stops the driving source 60K at the detection timing DK.

By stopping the driving of the image forming units 6 at such timings, in all the image forming units 6, the wipe member 32b (FIG. 4) can stop in a state immediately after ending contact by cleaning with the light emission side transmission window 33c and the light reception side transmission window 33d of the optical path lens 33 and separates from the light emission side transmission window 33c and the light reception side transmission window 33d.

Further, even if the "slip" time of the cleaning member 32 is set to approximately 75 [msec] at the time when the printing speed of 50 [ppm] is assumed, the "slip" time is less than 1/10 of the rotation cycle T (≈900 [msec]) of the wipe shaft 32a. Therefore, the wipe member 32b and the wipe member 32b can be stopped in a separated state without being affected by the "slip".

As explained above, with the image forming apparatus, even when the image forming apparatus includes the plurality of image forming units 6, the optical path lenses 33 and the wire members 32b of the image forming units 6 can be stopped in a separated state.

Even in an apparatus configured to drive the plurality of image forming units 6 with one driving source 60, it is possible to reduce, as much as possible, the number of the image forming units 6 in which the optical path lenses 33 and the wipe members 32b stop in a contact state.

Even when there is only one image forming unit 6 in which the optical path lens 33 and the wipe member 32b can surely stop in a separated state, the image forming unit 6 is replaced in order every time driving is stopped. Therefore, a risk of residual amount detection accuracy deterioration does not concentrate on one image forming unit and is distributed to all image forming units. Therefore, it is possible to prevent a reduction in the life of the image forming apparatus.

The controller 50 or 150 can be implemented using: a memory as a storage device that stores a control program; and a processor that executes the control program stored in the memory. Otherwise, parts of the controller 50 or 150 may be implemented using a circuit, and the rests of the controller 50 or 150 may be implemented using: a memory as a storage device that stores a control program; and a processor that executes the control program stored in the memory.

In the above one or more embodiments, the tandem-type color printer including the plurality of developing units is explained as the example of the image forming apparatus. However, besides the color prisoner, the image forming apparatus is useful as an image forming apparatus such as a copying machine, a FAX, or an MFP (Multi Function Peripheral) in which functions of these apparatuses are combined. The image forming apparatus is also useful as a monochrome image forming apparatus including one image forming unit.

The invention includes other embodiments in addition to the above-described embodiments without departing from the spirit of the invention. The embodiments are to be considered in all respects as illustrative, and not restrictive. The scope of the invention is indicated by the appended claims rather than by the foregoing description. Hence, all configurations including the meaning and range within equivalent arrangements of the claims are intended to be embraced in the invention.

The invention claimed is:

1. An image forming apparatus comprising:
   an image forming unit that includes a developer storing section storing therein a developer, and that forms a developer image;
   an optical path member including a first optical path that includes a first light transmission window and guides light received from a light emitting element to the first light transmission window and a second optical path that includes a second light transmission window and guides light received by the second light transmission window to a light receiving element, the first light transmission window and the second light transmission window being disposed across a predetermined gap in the developer storing section;
   a cleaning member disposed in the developer storing section and including a rotational shaft and a sliding member that has flexibility, rotates together with the rotational shaft, and passes the gap while sliding on the first light transmission window and the second light transmission window in a predetermined rotation region;

a control section that controls operation of at least the image forming unit;

a driving source that drives the image forming unit and drives rotation of at least the cleaning member based on an instruction of the control section; and a developer-residual-amount detecting section that causes the light emitting element to emit light based on an instruction of the control section and transmits light reception information based on light reception of the light receiving element to the control section, wherein the control section detects, based on the light reception information, a passage timing at which the sliding member passes through the gap, and stops the driving by the driving source based on the passage timing.

2. The image forming apparatus according to claim 1, wherein the passage timing is timing at which the sliding member ends the passage through the gap.

3. The image forming apparatus according to claim 2, wherein the image forming unit comprises a plurality of image forming units, the driving source comprises a plurality of driving sources that respectively drives the plurality of image forming units, and the control section inputs passage timings of the plurality of image forming units and stops the driving of each of the plurality of image forming units by the driving sources, based on the input passage timing in the corresponding image forming unit.

4. The image forming apparatus according to claim 2, wherein the image forming unit comprises a plurality of image forming units that are driven by the driving source as a single driving source, the control section includes:
 a memory that stores passage timings of the plurality of image forming units; and
 an arithmetic section that calculates a time interval between the passage timings, and the control section determines, based on a calculation result of the arithmetic section, a timing at which the driving of the single driving source is to be stopped.

5. The image forming apparatus according to claim 4, wherein, when a maximum value of the time interval is equal to or larger than a predetermined threshold, the control section stops the driving of the single driving source based on the passage timing which is a start point of the time interval having the maximum value.

6. The image forming apparatus according to claim 4, wherein, when a maximum value of the time interval is smaller than a predetermined threshold, the control section stops the driving of each of the plurality of image forming units by the single driving source, based on the passage timing in the corresponding image forming unit.

7. The image forming apparatus according to claim 2, wherein the image forming unit comprises a plurality of image forming units that are driven by the driving source as a single driving source, and the control section stops the driving of each of the plurality of image forming units based on the passage timing in the corresponding image forming unit.

8. An image forming apparatus comprising:

an image forming unit that includes a developer storing section storing therein a developer, and that forms a developer image;

an optical path member including a first optical path that includes a first light transmission window and guides light received from a light emitting element to the first light transmission window and a second optical path that includes a second light transmission window and guides light received by the second light transmission window to a light receiving element, the first light transmission window and the second light transmission window being disposed across a predetermined gap in the developer storing section;

a cleaning member having flexibility, disposed in the developer storing section, and configured to be driven to repeatedly pass through the gap to clean the first light transmission window and the second light transmission window;

a control section that controls operation of at least the image forming unit;

a driving source that drives the image forming unit and drives the cleaning member based on an instruction of the control section; and a developer-residual-amount detecting section that causes the light emitting element to emit light based on an instruction of the control section and transmits light reception information based on light reception of the light receiving element to the control section, wherein the control section stops, after detecting a change of the light reception information that indicates a passage of the cleaning member through the gap based on a predetermined threshold, the driving of the cleaning member by the driving source such that the cleaning member is stopped at a position where the cleaning member is spaced away from the first and second light transmission windows.

* * * * *